United States Patent
Lee et al.

(10) Patent No.: US 9,001,814 B2
(45) Date of Patent: Apr. 7, 2015

(54) METHOD FOR TRANSMITTING UPLINK SIGNALS

(75) Inventors: Dae Won Lee, Anyang-si (KR); Bong Hoe Kim, Anyang-si (KR); Young Woo Yun, Anyang-si (KR); Ki Jun Kim, Anyang-si (KR); Dong Wook Roh, Anyang-si (KR); Hak Seong Kim, Anyang-si (KR); Hyun Wook Park, Anyang-si (KR)

(73) Assignee: Optis Cellular Technology, LLC, Plano, TX (US)

( * ) Notice: Subject to any disclaimer, the term of this patent is extended or adjusted under 35 U.S.C. 154(b) by 493 days.

(21) Appl. No.: 13/316,315

(22) Filed: Dec. 9, 2011

(65) Prior Publication Data

US 2012/0082117 A1    Apr. 5, 2012

Related U.S. Application Data

(63) Continuation of application No. 12/209,136, filed on Sep. 11, 2008, now Pat. No. 8,102,833.

(60) Provisional application No. 60/972,244, filed on Sep. 13, 2007, provisional application No. 60/987,427, filed on Nov. 13, 2007, provisional application No. 60/988,433, filed on Nov. 16, 2007.

(30) Foreign Application Priority Data

Jul. 15, 2008   (KR) .................. 10-2008-0068634

(51) Int. Cl.
*H04B 7/208* (2006.01)
*H04L 1/00* (2006.01)
(Continued)

(52) U.S. Cl.
CPC ............ *H04L 1/0081* (2013.01); *H04L 1/1664* (2013.01); *H04L 1/1671* (2013.01); *H04L 1/1861* (2013.01); *H04L 5/0007* (2013.01); *H04L 5/0053* (2013.01)

(58) Field of Classification Search
CPC ... H04L 1/0081; H04L 1/1664; H04L 5/0053; H04L 1/1861; H04L 5/0007; H04L 1/1671
USPC ................. 370/208, 252, 294, 295, 315, 319, 370/328–330, 335, 336, 338, 344, 210; 455/450, 509
See application file for complete search history.

(56) References Cited

U.S. PATENT DOCUMENTS

2003/0185159 A1   10/2003   Seo et al.
2005/0232138 A1   10/2005   Byun et al.
(Continued)

FOREIGN PATENT DOCUMENTS

CN        1964340        5/2007
EP        1569403        8/2005
(Continued)

OTHER PUBLICATIONS

3GPP TSG RAN1 #50, R1-073361, Aug. 20-24, 2007 (From Applicant's IDS filed on May 5, 2014).*

(Continued)

*Primary Examiner* — Mang Yeung
(74) *Attorney, Agent, or Firm* — Nixon & Vanderhye, P.C.

(57) ABSTRACT

A method for transmitting uplink signals, which include ACK/NACK signals, control signals other than the ACK/NACK signals, and data signals, is disclosed. The method comprises serially multiplexing the control signals and the data signals; sequentially mapping the multiplexed signals within a specific resource region in accordance with a time-first mapping method, the specific resource region including a plurality of symbols and a plurality of virtual subcarriers; and arranging the ACK/NACK signals at both symbols near symbols to which a reference signal of the plurality of symbols is transmitted. Thus, the uplink signals can be transmitted to improve receiving reliability of signals having high priority.

10 Claims, 9 Drawing Sheets

(51) Int. Cl.
*H04L 1/16* (2006.01)
*H04L 1/18* (2006.01)
*H04L 5/00* (2006.01)

(56) References Cited

U.S. PATENT DOCUMENTS

| | | | |
|---|---|---|---|
| 2005/0286402 A1 | 12/2005 | Byun et al. | |
| 2006/0098568 A1 | 5/2006 | Oh et al. | |
| 2008/0304467 A1* | 12/2008 | Papasakellariou et al. ... | 370/344 |
| 2009/0010240 A1* | 1/2009 | Papasakellariou et al. ... | 370/344 |
| 2010/0254331 A1* | 10/2010 | Kim et al. ............... | 370/329 |

FOREIGN PATENT DOCUMENTS

| | | |
|---|---|---|
| EP | 1806867 | 7/2007 |
| EP | 1811701 | 7/2007 |
| JP | 2007135021 | 5/2007 |
| KR | 10-2004-0056976 | 7/2004 |
| KR | 10-2005-0114569 | 12/2005 |
| TW | 200400713 | 1/2004 |
| WO | 2006130742 | 12/2006 |
| WO | 2007/078146 | 7/2007 |
| WO | 2007081145 | 7/2007 |

OTHER PUBLICATIONS

3GPP TSG RAN WG1 #51bis, R1-080267, Jan. 14-16, 2008 (From Applicant's IDS filed on Dec. 4, 2014).*
Japanese Office Action and English translation thereof mailed Feb. 4, 2014 in Japanese Application 2013-004901.
3GPP TSG RAN1 #50, R1-073361, Motorola, "Uplink channel Interleaving", Athens, Greece, Aug. 20-24, 2007.
Korean Notice of Rejection and English translation thereof mailed Oct. 28, 2014 in Korean Application 10-2008-0068634.
U.S. Appl. No. 60/942,843, filed Jun. 8, 2007, entitled "Control and Data Signaling in SC-FDMA Communication Systems".
3GPP TSG RAN WG1#51bis, R1-080267, "PUSCH Multiplexing of Data, Control, and ACK/NACK Information", Sevilla, Spain; Jan. 14-16, 2008.

* cited by examiner

METHOD FOR TRANSMITTING UPLINK SIGNALS

CROSS-REFERENCE TO RELATED APPLICATIONS

This application is a continuation of U.S. application Ser. No. 12/209,136, filed on Sep. 11, 2008, currently pending, which claims the benefit of the Korean Patent Application No. 10-2008-0068634, filed on Jul. 15, 2008, and also claims the benefit of U.S. Provisional Application Nos. 60/972,244, filed on Sep. 13, 2007, 60/987,427, filed on Nov. 13, 2007, and 60/988,433, filed on Nov. 16, 2007, which are all hereby incorporated by reference herein in their entirety.

This application also claims the benefit of U.S. Provisional Application Ser. Nos. 60/972,244, filed on Sep. 13, 2007, 60/987,427, filed on Nov. 13, 2007 and 60/988,433, filed on Nov. 16, 2007, the contents of which are hereby incorporated by reference herein in their entirety.

BACKGROUND OF THE INVENTION

1. Field of the Invention

The present invention relates to mobile communication technology, and more particularly, to technology of transmitting uplink signals including ACK/NACK signals, control signals other than the ACK/NACK signals, and data signals.

2. Discussion of the Related Art

A user equipment (UE) of a mobile communication system transmits various signals through an uplink. Uplink signals transmitted by the user equipment can be segmented into data signals and control signals. Also, examples of the control signals transmitted to the uplink include uplink ACK/NACK signals for HARQ communication, channel quality indicator (CQI) information, and precoding matrix index (PMI).

3GPP LTE system uses a single carrier frequency division multiplexing access (SC-FDMA) scheme for uplink signal transmission. Also, the 3GPP LTE system prescribes that data signals and control signals among the uplink signals are first multiplexed and ACK/NACK signals are transmitted to the multiplexed signals by puncturing the data or control signals when uplink ACK/NACK signal transmission is required for downlink data. Hereinafter, in order that the ACK/NACK signals are divided from control signals other than the ACK/NACK signals, the control signals will mean those except for the ACK/NACK signals.

Meanwhile, Athens conference (#50) for 3GPP LTE has decided that data information is rate matched together with control information when the control information is multiplexed with the data information, wherein the control information is transmitted near a reference signal. This is to improve channel estimation performance by approximating all the control signals to the reference signal as the control signals generally require higher reliability than the data signals.

However, the control signals transmitted to the uplink include various signals as described above, and the ACK/NACK signals require higher reliability than the other control signals. In this case, when uplink ACK/NACK signal transmission is required while all the control signals are transmitted by approximating to the reference signal, problems occur in that the ACK/NACK signals can neither be transmitted by puncturing the control signals arranged near the reference signal nor be transmitted near the reference signal.

In this respect, a technology of transmitting uplink signals by efficiently arranging ACK/NACK signals and other control signals in a resource region considering priority among them is required.

SUMMARY OF THE INVENTION

Accordingly, the present invention is directed to a method for transmitting uplink signals, which substantially obviates one or more problems due to limitations and disadvantages of the related art.

An object of the present invention is to provide a method for transmitting uplink signals by efficiently arranging ACK/NACK signals and other control signals in a resource region considering priority among them.

Another object of the present invention is to provide transmitting uplink signals using the aforementioned signal arrangement.

To achieve these objects and other advantages and in accordance with the purpose of the invention, as embodied and broadly described herein, the present invention provides a method for transmitting uplink signals, which include ACK/NACK signals, control signals other than the ACK/NACK signals, and data signals. The method comprises serially multiplexing the control signals and the data signals; sequentially mapping the multiplexed signals within a specific resource region in accordance with a time-first mapping method, the specific resource region including a plurality of symbols and a plurality of virtual subcarriers; and arranging the ACK/NACK signals at both symbols near to symbols through which a reference signal is transmitted.

At this time, the ACK/NACK signals are overwritten on a part of the multiplexed signals. And, the part of the multiplexed signals, on which the ACK/NACK signals are overwritten, includes one or more of the control signals and the data signals.

Also, the method further comprises performing a discrete fourier transform (DFT) for the signals mapped on the specific resource region in a unit of each symbols of the plurality of symbols in accordance with each index of the plurality of virtual subcarriers; performing an inverse fast fourier transform (IFFT) for the DFT symbol unit signals and attaching a cyclic prefix (CP) the signals; and transmitting the symbol unit signals attached with the CP as single carrier frequency division multiplexing access (SC-FDMA) symbols.

Also, the method further comprises transmitting the signals mapped on the specific resource region through a physical uplink sharing channel (PUSCH).

In another aspect of the present invention, the present invention provides a method for transmitting uplink signals, which include ACK/NACK signals, control signals other than the ACK/NACK signals, and data signals. The method comprises performing channel coding for each of the data signals, the control signals, and the ACK/NACK signals; serially multiplexing the channel coded data and control signals; sequentially mapping the multiplexed signals in accordance with a time-first mapping method within a specific resource region in accordance with a time-first mapping method, the specific resource region including a plurality of symbols and a plurality of virtual subcarriers; and arranging the ACK/NACK signals at both symbols near to the symbols through which a reference signal is transmitted.

At this time, the step of performing channel coding for the data signals includes attaching a CRC for a transport block (TB) to a transport block for transmission of the data signals; segmenting the transport block attached with the CRC for the transport block in a code block unit and attaching a CRC for a code block to the segmented code block; performing channel coding for the data attached with the CRC for a code block; and performing rate matching and code block concatenation for the channel coded data.

According to the aforementioned embodiments of the present invention, it is possible to transmit uplink signals by efficiently arranging ACK/NACK signals and other control signals in a resource region in accordance with priority among them.

In addition, the ACK/NACK signals having high priority can be set in such a manner that they acquire more channel estimation effect.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters.

Meanwhile, in some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

As described above, the embodiment of the present invention is intended to provide a method for transmitting uplink signals by efficiently arranging ACK/NACK signals and other control signals in a resource region considering priority among them. To this end, a detailed method for transmitting uplink signals in a 3GPP LTE system will be described.

Figure 1:
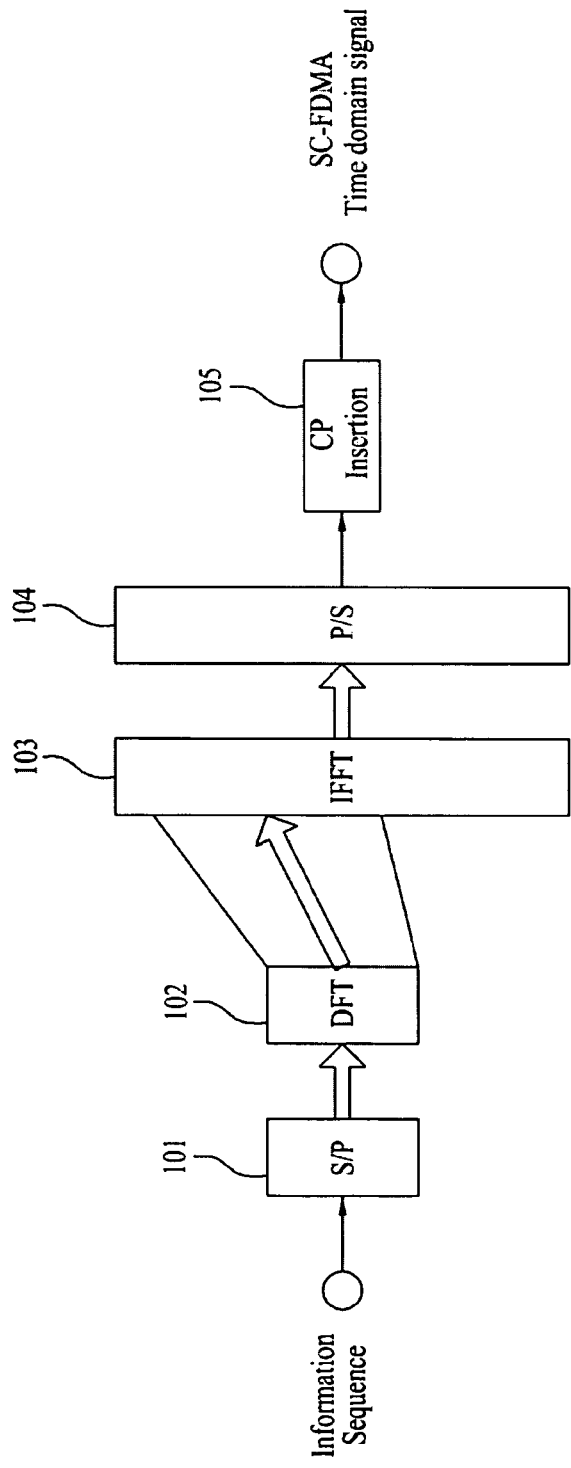
FIG. 1 is a block diagram illustrating a transmitter to describe a method for transmitting signals in accordance with a single carrier frequency division multiplexing access (SC-FDMA) scheme.

FIG. 1 is a block diagram illustrating a transmitter to describe a method for transmitting signals in accordance with a single carrier frequency division multiplexing access (SC-FDMA) scheme.

As described above, a 3GPP LTE system transmits uplink signals in accordance with a single carrier frequency division multiplexing access (SC-FDMA) scheme. In detail, direct-to-parallel conversion is performed for information sequences to be transmitted, to perform a discrete fourier transform (DFT) (101). The DFT is performed for the signals converted to the parallel sequences (102), and then inverse fast fourier transform (IFFY) can be performed to obtain a single carrier feature (103). At this time, a length of information inserted to an IFFY module 103 may not be equal to a size of the IFFY module 103. However, it is required that the DFT result performed by the DFT module 102 should be mapped with continuous IFFY input indexes.

Values undergone IFFY are again converted to serial signals by a parallel-to-serial conversion module 104. Afterwards, the signals are changed to a format of OFDM symbols by a cyclic prefix (CP) (105) and then transmitted to a real time space.

The aforementioned SC-FDMA scheme has advantages in that it has low peak power-to-average power ratio (PAPR) and/or cubic metric (CM) while maintaining a single carrier feature. However, in order to satisfy low PAPR/CM condition while maintaining a single carrier feature, it is required that information undergone DFT precoding should be input to the IFFT module 103 in an OFDM format by mapping with continuous indexes. In other words, it is required that DFT precoded information should be inserted to continuous subcarriers of OFDM. Accordingly, it is preferable that information data (for example, control information and data information) having different features are multiplexed together when they are transmitted to an uplink so that they undergo DFT precoding together and then are transmitted in an OFDM format.

Hereinafter, a procedure of multiplexing data information and control information will be described.

Figure 2:
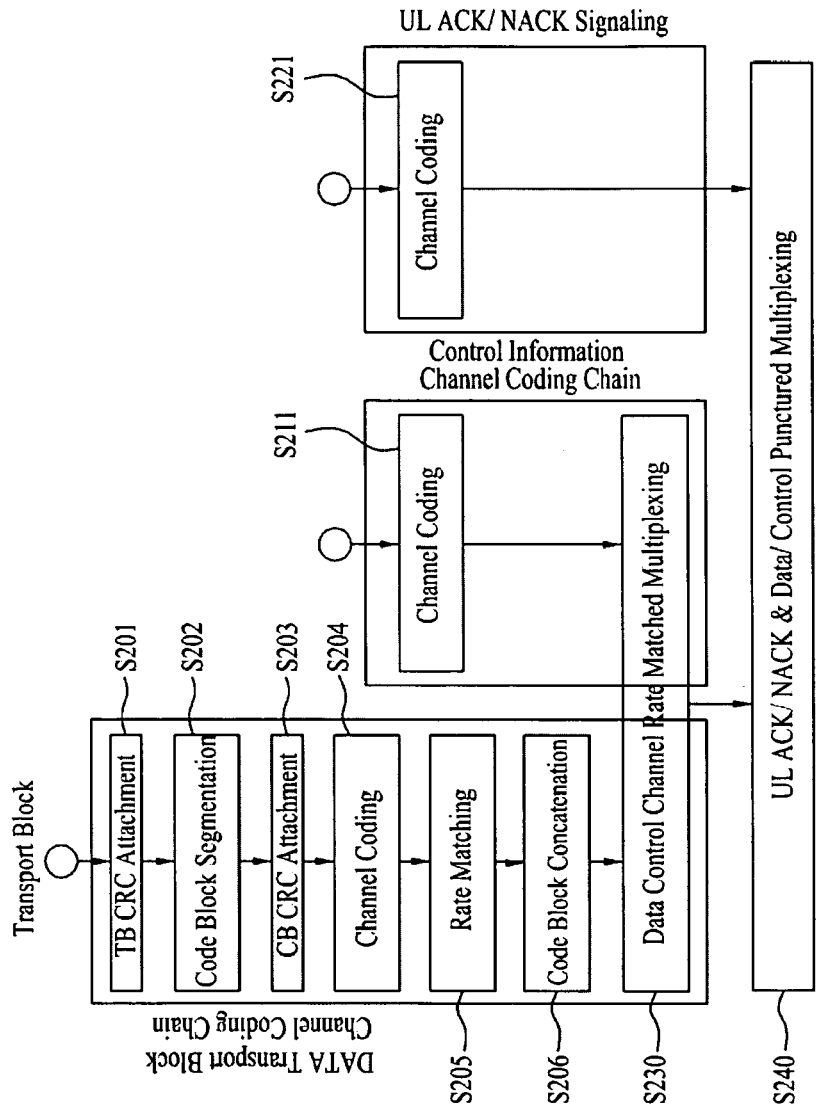
FIG. 2 is a diagram illustrating a procedure of multiplexing data information, control information and ACK/NACK signals for uplink signal transmission.

FIG. 2 is a diagram illustrating a procedure of multiplexing data information, control information and ACK/NACK signals for uplink signal transmission.

Data information multiplexed with control information is segmented into several code blocks (CB) in accordance with a size of a transport block (TB) to be transmitted to the uplink after CRC for TB is attached to the TB (S201 and S202). Afterwards, the CRC for CB is attached to several CBs (S203), and channel coding is performed for the result value obtained by attaching the CRC for CB to several CBs (S204). Also, after the channel coded data undergo rate matching (S205), concatenation among CBs is performed (S206). The CBs are then multiplexed with control information (S230). Meanwhile, the aforementioned steps may be subject to channel coding chain for a data transport block.

Channel coding can be performed for the control information separately from the data information (S211). The channel coded control information can later be multiplexed with the data information by a data and control channel rate mapping multiplexer (S230).

Channel coding can be performed for the ACK/NACK signals separately from the data and control signals (S221). Some of the uplink signals in which the data and control signals are multiplexed (S230) may be transmitted to the uplink through puncturing (S240).

As described above, the control information that can be transmitted together with the data information is segmented into two types, i.e., uplink (UL) ACK/NACK signals for downlink data and other control information. The uplink ACK/NACK signals for downlink data are transmitted only when downlink data exist. A user equipment may not know whether to receive downlink data even though it should transmit the UL ACK/NACK signals. Accordingly, the user equipment segments the two types of control information from each other and transmits them to the uplink together with the data information. Hereinafter, in order to segment the ACK/NACK signals from the control signals transmitted separately from the ACK/NACK signals, "control signals" will mean those other than the ACK/NACK signals. In more detailed embodiment, the control signals may mean those other than a rank indicator as well as the ACK/NACK signals. In other words, in a specific embodiment, the control signals may include CQI and PMI. However, since the following description relates to efficient arrangement among the control signals, the data signals and the ACK/NACK signals, if the control signals are those other than the ACK/NACK signals, their detailed type will not be suggested.

When the data information is transmitted to the uplink, the data information can be transmitted together with the control information. Also, ACK/NACK information can be transmitted together with the data information and the control information. Moreover, only the data information and the ACK/NACK information can be transmitted to the uplink.

Transmission information sequences obtained to transmit the data information multiplexed with the control information or the ACK/NACK information can be transmitted in accordance with the SC-FDMA scheme. At this time, the transmission information sequences can be mapped in a resource region in accordance with a time-first mapping method.

For example, it is supposed that the information sequences are transmitted using one resource block, i.e., twelve (12) OFDM subcarriers and information is transmitted through one sub-frame. Also, it is supposed that one sub-frame includes fourteen (14) SC-FDMA symbols and two of the fourteen SC-FDMS symbols are used as references signals that are pilot signals. At this time, the number of modulation symbols of the information that can be transmitted to the uplink becomes 12*12=144.

144 information sequence symbols can be transmitted through 12 virtual subcarriers and 12 SC-FDMA symbols. This can be represented by a matrix structure of 12*12 called a time-frequency mapper. The information sequences to be transmitted to the uplink are mapped one by one based on the SC-FDMA symbols. This is called time-first mapping because the SC-FDMA symbols are segmented temporally.

Figure 3:
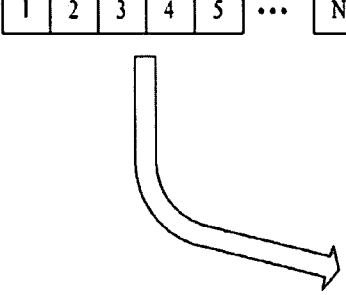
FIG. 3 is a diagram illustrating an example of mapping information sequences according to one embodiment of the present invention in accordance with a time-first mapping method
Figure 4:
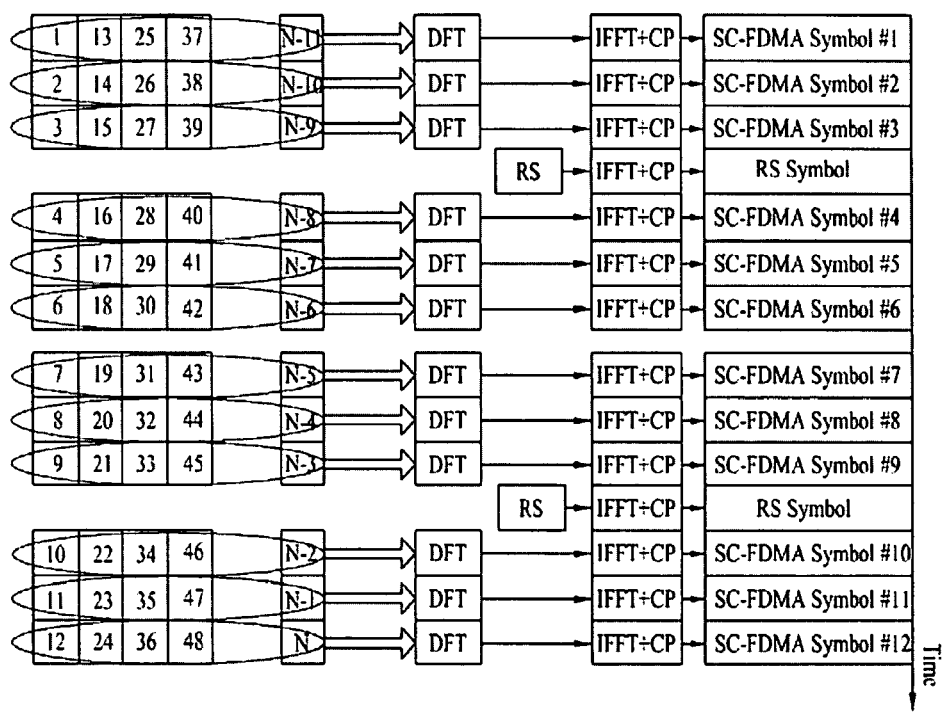
FIG. 4 and FIG. 5 are diagrams illustrating a method for transmitting information, which is mapped in accordance with the time-first mapping method as illustrated in FIG. 3, in accordance with the SC-FDMA scheme.
Figure 5:
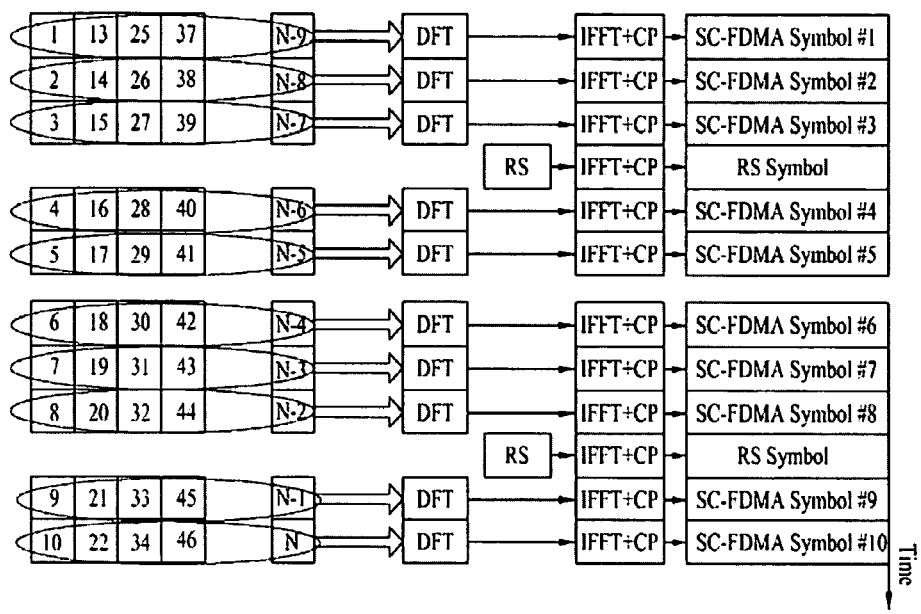

FIG. 3 is a diagram illustrating an example of mapping information sequences according to one embodiment of the present invention in accordance with a time-first mapping method, and FIG. 4 and FIG. 5 are diagrams illustrating a method for transmitting information, which is mapped in accordance with the time-first mapping method as illustrated in FIG. 3, in accordance with the SC-FDMA scheme.

The information sequences to be transmitted to the uplink can be arranged temporally in the time-frequency mapper as illustrated in FIG. 3. In other words, 12 information data are mapped temporally in a first virtual subcarrier region, and then subsequent 12 information data are mapped temporally in a second virtual subcarrier region.

After time-frequency mapping is performed as above, the sequences arranged on a frequency axis as illustrated in FIG. 4 and FIG. 5 undergo DFT and then are inserted to a desired frequency band. Afterwards, IFFT and CP insertion are performed for each frequency region information, which can be transmitted as SC-FDMA symbols. FIG. 4 and FIG. 5 illustrate a procedure of generating and transmitting the SC-FDMA symbols. FIG. 4 illustrates a case where a normal CP is used, and FIG. 5 illustrates a case where an extended CP is used.

When data are transmitted to the uplink, the control information can also be transmitted thereto. At this time, the control information and the data information are multiplexed through rate matching. However, the ACK/NACK information can be transmitted in such a manner that it is overwritten in bit streams of the data information or symbols where data information and control information are multiplexed. In this case, "overwritten" means that specific information mapped in the resource region is skipped and the corresponding region is mapped. Also, "overwritten" means that the length of the entire information is maintained equally even after specific information is inserted. This overwriting procedure may be represented by puncturing.

Generally, the control information requires higher reliability than the data information. To this end, the control information should be multiplexed or inserted near the reference signal. In this case, it is possible to obtain the effect of channel estimation performance, thereby expecting improvement of performance.

However, since the ACK/NACK information also requires high reliability in a receiver, if the general control information is arranged near the reference signal, priority between the control information and the ACK/NACK signals should be considered.

Accordingly, methods for multiplexing data information bit streams, control information bit streams, and ACK/NACK information sequences at different priorities will be described as various embodiments of the present invention.

According to one embodiment of the present invention, the control information is multiplexed serially with the data information, and is mapped with a multiplexing region in accordance with the aforementioned time-first mapping method. In this case, "multiplexed serially" means that the data information is mapped with a sequence corresponding to the multiplexed result directly after the control information is mapped with the sequence, or vice versa. Also, according to one embodiment of the present invention, the ACK/NACK signals are arranged to be transmitted through both symbols near a symbol through which the reference signal is transmitted.

Figure 6:
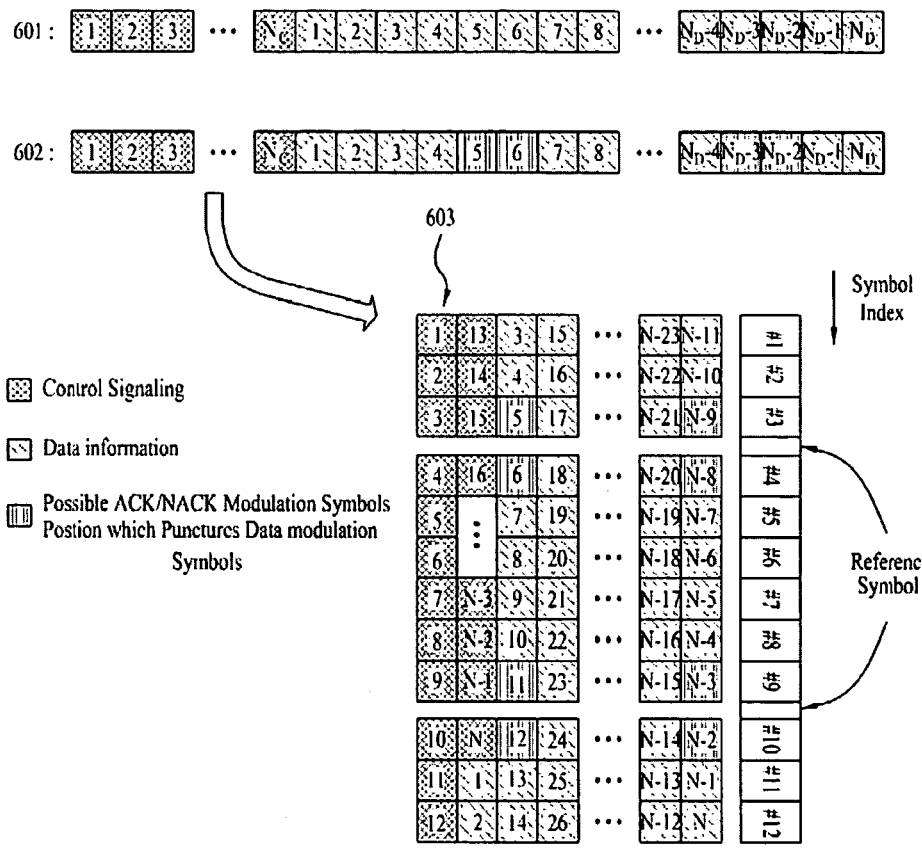
FIG. 6 is a diagram illustrating a method for transmitting uplink signals in accordance with one embodiment of the present invention.

FIG. 6 is a diagram illustrating a method for transmitting uplink signals in accordance with one embodiment of the present invention.

According to this embodiment, when the control information and the data information are multiplexed, they are serially connected with each other so that they are mapped with SC-FDMS symbols in accordance with the time-first mapping method and then are transmitted to the uplink. If the ACK/NACK information should also be transmitted, among the serially multiplexed data, modulation symbols located near the reference signal are punctured so that the ACK/NACK signals are inserted thereto. In FIG. 6, a reference numeral 601 illustrates that the data and control signals are multiplexed serially if the ACK/NACK signals are not transmitted. A reference numeral 602 illustrates that the ACK/

NACK signals are arranged by puncturing the multiplexed data if the ACK/NACK signals should be transmitted to the uplink. Also, a reference numeral 603 illustrates that information sequences such as the reference numeral 602 are mapped in the time-frequency region in accordance with the time-first mapping method. In the reference numeral 603 of FIG. 6, it is supposed that the reference signal is transmitted through a part between symbol indexes #3 and #4 and a part between symbol indexes #9 and #10.

As can be aware of it from the mapping type illustrated in the reference numeral 603 of FIG. 6, after the control signals are serially connected with data and then multiplexed, they are mapped in the time-frequency region in accordance with the time-first mapping method. Also, the ACK/NACK signals can be set in such a manner that they are overwritten in the data signals multiplexed with two symbols (symbols #3, 4, 9 and 10 in FIG. 6) at both sides of the SC-FDMA symbols to which the reference signal is transmitted.

Figure 7:
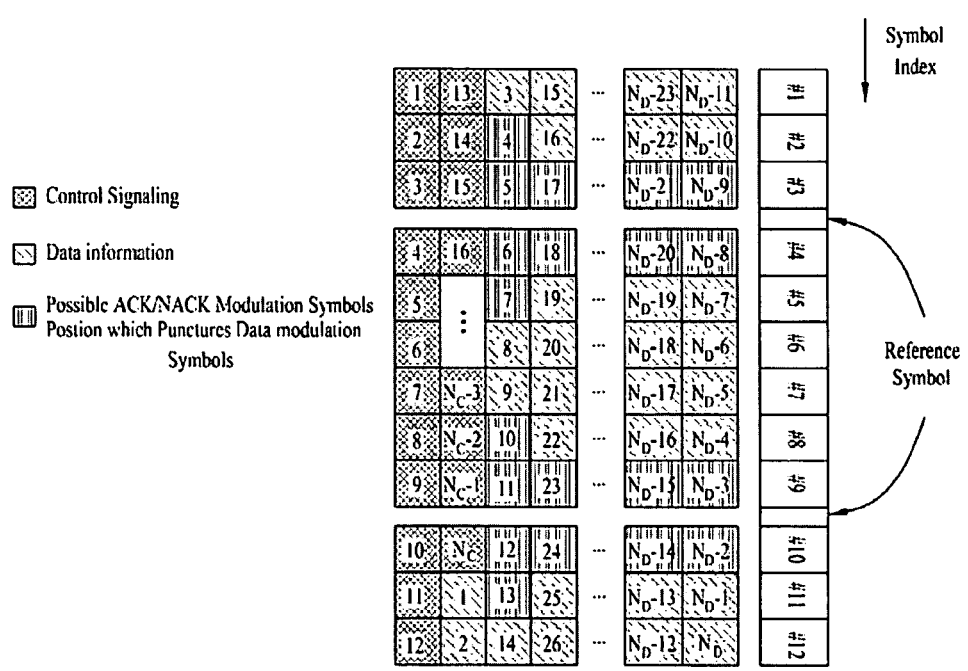
FIG. 7 and FIG. 8 are diagrams illustrating a method for processing a number of ACK/NACK information data to be transmitted in accordance with one embodiment of the present invention.
Figure 8:
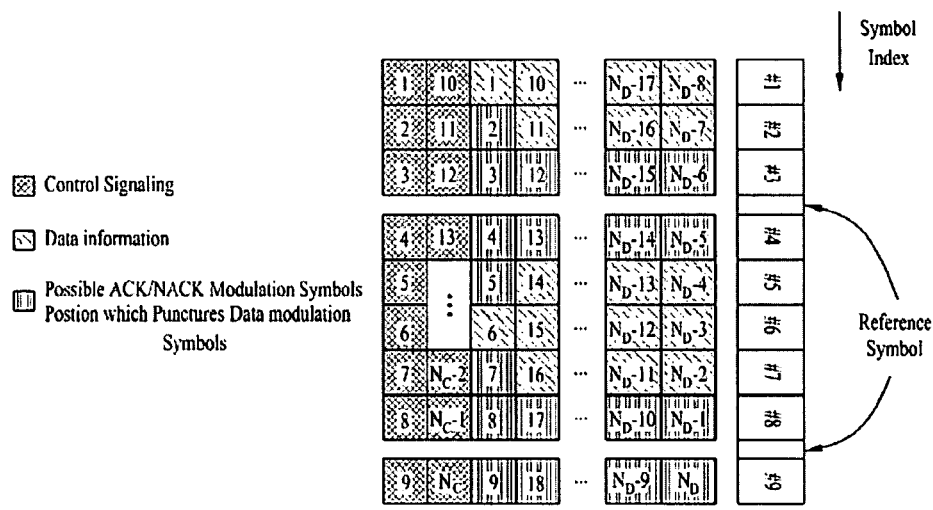

FIG. 7 and FIG. 8 are diagrams illustrating a method for processing a number of ACK/NACK information data to be transmitted in accordance with one embodiment of the present invention.

In detail, when the number of ACK/NACK information data to be transmitted is more than the number of subcarriers (of a virtual frequency region) to which data are transmitted before and after the reference signal, the ACK/NACK information can be transmitted through additional SC-FDMA symbols in addition to both symbols nearest to the reference signal. In FIG. 7 and FIG. 8, the ACK/NACK information is transmitted through additional symbols in the order of the symbols near reference symbols in addition to both symbols near the reference symbols.

At this time, the SC-FDMA symbols existing based on the reference signal may not be arranged symmetrically depending on a structure of the SC-FDMA sub-frame of the uplink as illustrated in FIG. 8. Accordingly, considering this, the ACK/NACK information should be inserted by puncturing.

When the control information is arranged on the time-axis in accordance with the aforementioned embodiment of the present invention, the control information and the data information are arranged in due order so that they are mapped in the resource region. Also, if the ACK/NACK information is arranged near the reference signal, the ACK/NACK information can be overwritten in the control information as well as the data information.

Figure 9:
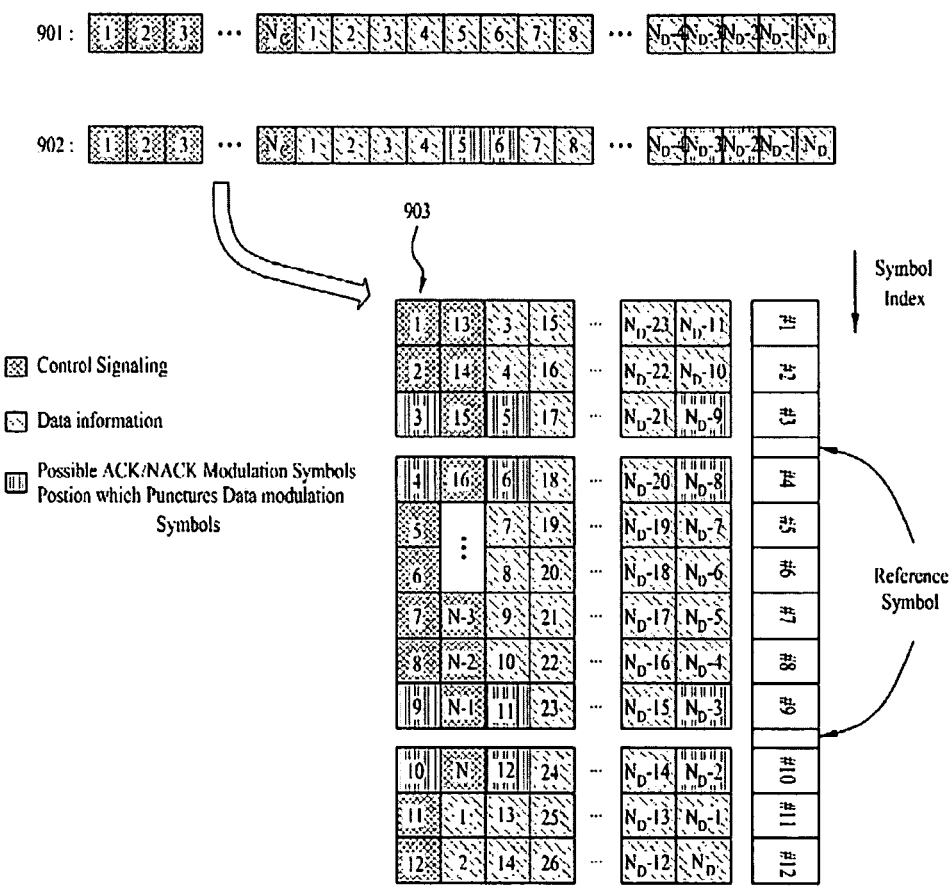
FIG. 9 is a diagram illustrating that ACK/NACK signals are inserted by puncturing the control signals as well as the data signals in accordance with another embodiment of the present invention.

FIG. 9 is a diagram illustrating that the ACK/NACK signals are inserted by puncturing the control signals as well as the data signals in accordance with another embodiment of the present invention.

According to this embodiment, since the ACK/NACK information is substantially control information, priority is given to control information channels, so that the control information channel having the highest priority is arranged near the reference signal for protection of channel estimation while the control information channels having relatively low priority are sequentially mapped on the time axis and then transmitted. Particularly, in this embodiment, it is supposed that the ACK/NACK information has higher priority than the control information. At this time, the control information and the data information are sequentially arranged on the time axis in accordance with the time-first mapping method and then multiplexed. The ACK/NACK information punctures the data/control information located near the reference signal.

In detail, a reference numeral 901 of FIG. 9 illustrates that the data and control signals are multiplexed if the ACK/NACK signals need not to be transmitted. A reference numeral 902 of FIG. 9 illustrates that data, control signals and ACK/NACK signals are multiplexed if the ACK/NACK signals should be transmitted. Also, a reference numeral 903 of FIG. 9 illustrates that the multiplexed uplink signals are mapped in the time-frequency region as illustrated in the reference numeral 902.

As illustrated in the reference numeral 903 of FIG. 9, it is noted from this embodiment that the ACK/NACK signals can puncture the control signals as well as the data matched near the reference signal. In this way, if resource mapping is performed by giving priority to the control signals, good channel estimation effect can be obtained as the ACK/NACK information is located near the reference signal. On the other hand, since a small number of control signals are punctured by the ACK/NACK signals, it may not affect performance. In one embodiment shown in FIG. 9, the ACK/NACK signals may puncture the control signals/data equally distributed in the virtual frequency axis. That is, if the number of virtual subcarriers available for the above puncturing by the ACK/NACK signals is "N" and the number of ACK/NACK to be transmitted per SC-FDMA symbol is "m", the ACK/NACK signals may puncture the control signals/data equally distributed having the interval of "N/m" or equivalent.

Also, since the control information and the data information are multiplexed simply, a multiplexing block can be formed simply.

Hereinafter, a whole procedure of transmitting uplink signals in accordance with the aforementioned embodiments of the present invention will be described. For convenience of description, this procedure will be described with reference to FIG. 2.

In order to transmit the uplink signals in accordance with each of the embodiments of the present invention, the transmitter performs channel coding for each of data signals, control signals, and ACK/NACK signals. Channel coding for each of the uplink signals can be performed independently as illustrated in FIG. 2.

At this time, as illustrated in FIG. 2, the procedure of performing channel coding for the data signals can include steps of segmenting a TB attached with CRC for TB in a unit of CB (S202), attaching a CRC for CB to the segmented CBs (S203), performing channel coding for the data attached with the CRC for CB (S204), performing rate matching for the channel coded data (S206), and performing CB concatenation (S207).

The one embodiment of the present invention suggests that the channel coded data and control signals are multiplexed serially. Serial multiplexing means that the control signals are mapped with sequential indexes directly after the data signals are mapped with them, or vice versa. Meanwhile, the multiplexed signals can sequentially be mapped within a specific resource region in accordance with the time-first mapping method, wherein the specific resource region includes a plurality of symbols (for example, 12 SC-FDMA symbols) and a plurality of virtual subcarriers.

In addition, in this embodiment of the present invention, the ACK/NACK signals are preferably arranged near the symbols to which the reference signal is transmitted, among the plurality of symbols.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The embodiments of the present invention can be applied to various systems, which require data signal transmission, control signal transmission, and ACK/NACK signal transmission through the uplink, in addition to the 3GPP LTE system.

What is claimed is:

1. A method for a user equipment (UE) to transmit signals to a base station, the method comprising:
   multiplexing data and first type control information to output multiplexed signals to be transmitted via a Physical Uplink Shared Channel (PUSCH) when the UE is to transmit the data and the first type control information simultaneously;
   mapping the multiplexed signals to a R×C matrix, wherein the 'R' is equal to the number of rows of the matrix, and the 'C' is equal to the number of columns of the matrix which is determined based on a number of SC-FDMA symbols within one subframe except for specific SC-FDMA symbols used for a reference signal, and wherein the multiplexed signals are row-by-row mapped to the R×C matrix;
   mapping second type control information to the R×C matrix to overwrite some of the multiplexed signals mapped to specific columns of the R×C matrix corresponding to SC-FDMA symbols adjacent to the specific SC-FDMA symbols;
   wherein, in accordance with the time-first mapping, first control signals not including the second type information are mapped to extend along specific adjacent rows of the matrix whereby the first control signals are arranged orthogonally to the specific columns; and
   transmitting an output sequence of the R×C matrix to the base station, wherein the output sequence is a bit sequence read out column-by-column from the R×C matrix.

2. The method of claim 1, wherein the first control signals are sequentially mapped to extend along the specific adjacent rows.

3. The method of claim 1, wherein the multiplexed signals are mapped to the R×C matrix to form bit sequences being arranged along with time-domain units and having a length of 'C' bits.

4. The method of claim 1, wherein the second type control information comprises ACK/NACK information.

5. The method of claim 1, wherein transmitting the output sequence comprises:
   performing Discrete Fourier Transform (DFT) to the output sequence of the R×C matrix;
   performing Inverse Fast Fourier Transform (IFFT) to the DFT-performed sequence; and transmitting the IFFT performed sequence to the base station SC-FDMA symbol-by-SC-FDMA symbol.

6. A user equipment (UE) for transmitting signals to a base station, the UE comprising:
   a multiplexer configured for multiplexing data and first type control information output multiplexed signals to be transmitted via a Physical Uplink Shared Channel (PUSCH) when the UE is to transmit the data and the first type control information simultaneously;
   a mapping logic configured for
      mapping the multiplexed signals to a R×C matrix, wherein the 'R' is equal to the number of rows of the matrix, and the 'C' is equal to the number of columns of the matrix which is determined based on a number of SC-FDMA symbols within one subframe except for specific SC-FDMA symbols used for a reference signal, and wherein the multiplexed signals are row-by-row mapped to the R×C matrix, and
      mapping second type control information to the R×C matrix to overwrite some of the multiplexed signals mapped to specific columns of the R×C matrix corresponding to SC-FDMA symbols adjacent to the specific SC-FDMA symbols;
   in accordance with the time-first mapping, first control signals not including the second type information are mapped to extend along specific adjacent rows of the matrix whereby the first control signals are arranged orthogonally to the specific columns; and
   a transmitter configured for transmitting an output sequence of the R×C matrix to the base station,
      wherein the output sequence is a bit sequence read out column-by-column from the R×C matrix.

7. The UE of claim 6, wherein the first control signals are sequentially mapped to extend along the specific adjacent rows.

8. The UE of claim 6, wherein the multiplexed signals are mapped to the R×C matrix to form bit sequences being arranged along with time-domain units and having a length 'C' bits.

9. The UE of claim 6, wherein the second type control information comprises ACK/NACK information.

10. The UE of claim 6, wherein the transmitter comprises:
   a Discrete Fourier Transform (DFT) logic configured for performing DFT to the output sequence of the R×C matrix; and
   an Inverse Fast Fourier Transform (IFFT) logic configured for performing IFFT to the DFT-performed sequence.

* * * * *